United States Patent
Kidd et al.

(10) Patent No.: US 6,886,266 B2
(45) Date of Patent: May 3, 2005

(54) VEHICLE ALIGNMENT MEASUREMENT APPARATUS AND METHOD

(75) Inventors: Russell D. Kidd, Louisville, OH (US); Jay D. White, Massillon, OH (US); Robert J. Kenney, Broadview Heights, OH (US); Peter J. Savoy, Akron, OH (US); Jeffrey R. Wittlinger, Massillon, OH (US); Bert D. Rutledge, Carrollton, OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 10/656,468

(22) Filed: Sep. 5, 2003

(65) Prior Publication Data

US 2004/0107069 A1 Jun. 3, 2004

Related U.S. Application Data

(60) Provisional application No. 60/408,694, filed on Sep. 6, 2002.

(51) Int. Cl.$^7$ .............................................. G01D 21/00
(52) U.S. Cl. ............................ 33/608; 33/645; 33/288; 33/203.18
(58) Field of Search ............................ 33/264, 203.18, 33/203.19, 203.2, 203.21, 608, 613, 645, 193, 288

(56) References Cited

U.S. PATENT DOCUMENTS

| | | | |
|---|---|---|---|
| 2,479,723 A | | 8/1949 | Brown |
| 2,845,718 A | | 8/1958 | Keymer |
| 2,877,560 A | | 3/1959 | Brown et al. |
| 3,137,076 A | | 6/1964 | Hurst |
| 3,279,084 A | * | 10/1966 | Hindin et al. .................. 33/203 |
| 3,686,770 A | | 8/1972 | Davis |
| 3,691,642 A | * | 9/1972 | Nolte et al. .................... 33/193 |
| 3,869,804 A | * | 3/1975 | Friend ......................... 33/288 |
| 4,055,899 A | * | 11/1977 | Dean ........................... 33/193 |
| 4,347,668 A | | 9/1982 | Johnston |
| 4,546,548 A | * | 10/1985 | Bullock, Sr. .................. 33/203 |
| 4,577,413 A | * | 3/1986 | Mason ..................... 33/203.18 |
| 4,610,093 A | * | 9/1986 | Jarman et al. ................. 33/608 |
| 5,157,838 A | | 10/1992 | Sims |
| 5,546,665 A | * | 8/1996 | Jackmauh ..................... 33/203 |
| 5,625,953 A | * | 5/1997 | Healy et al. .............. 33/203.18 |
| 6,282,799 B1 | * | 9/2001 | Warkotsch ............... 33/203.18 |
| 6,397,448 B1 | * | 6/2002 | Cobb ....................... 29/407.05 |

* cited by examiner

Primary Examiner—Diego Gutierrez
Assistant Examiner—Amy R. Cohen
(74) Attorney, Agent, or Firm—Buckingham, Doolittle & Burroughs, LLP; David P. Dureska; Edward T. Kennedy

(57) ABSTRACT

A vehicle alignment measurement apparatus includes a first reference member removably mountable on a kingpin of a trailer and a second reference member removably mountable on selected ones of the trailer frame rails typically used to lock a movable slider having front and rear axles in place beneath the trailer. A third reference member is removably mountable on selected ones of wheels mounted on the axles. A distance between the first reference member and the second reference member, which is perpendicular to the rail, is measured to determine the alignment of the frame rails relative to the kingpin. A distance between the first reference member and the third reference member, which is aligned with the axle centerline, is measured to determine the alignment of the front axle relative to the kingpin. A pair of the third reference members can be used to align the rear axle to the front axle.

22 Claims, 7 Drawing Sheets

VEHICLE ALIGNMENT MEASUREMENT APPARATUS AND METHOD

CROSS-REFERENCE TO RELATED APPLICATION

This application claims the benefit of U.S. Provisional Patent Application Ser. No. 60/408,694, filed Sep. 6, 2002.

BACKGROUND OF THE INVENTION

1. Field of the Invention

The invention relates to the alignment of vehicles, and in particular to the alignment of heavy-duty vehicles such as semi-trailers or tractor-trailers. More particularly, the invention relates to an apparatus and method to quickly, accurately and repeatably measure the alignment of a heavy-duty vehicle.

2. Background Art

Proper alignment of vehicles is important for a number of reasons, but its primary purpose is to increase tire life. This is because the tires of improperly aligned vehicles typically wear faster. Proper alignment also is important for semi-trailers and tractor-trailers, that is, those heavy-duty vehicles having a tractor which pulls a trailer. The trailer is attached at its front end to the rear of the tractor via a kingpin which is mounted on and depends from the bottom of the trailer. Most trailers have at least a pair of axles for mounting wheels/tires, with the rearwardmost tandem axles being mounted on a subframe assembly commonly referred to as a slider. The slider is movable fore and aft beneath the trailer along rails which are mounted on and depend from the trailer frame or cross members, to enable repositioning of the axles for adjusting the load on the axles to meet various road and bridge laws.

Three measurements are important in the alignment process for semi-trailers. The first is the alignment of the trailer frame rails relative to the trailer kingpin. This measurement is typically made in the factory, when the frame rails are to be welded to the trailer. The second is alignment of the front slider axle relative to the kingpin, commonly referred to as the "thrust angle," which is measured both in the factory and in the field. The third is the alignment of any other slider axles relative to the front axle, which is also measured in both the factory and in the field.

Manufacturers and dealers of semi-trailers have for many years recognized the difficulty of achieving an accurate and repeatable alignment system. For example, to measure the alignment of the trailer frame rails, the frame rails are typically placed up against a stop in a fixture. A standard tape measure then is used to measure the placement of the rails before they are welded to the trailer frame. This system fails to provide alignment measurements that are accurate or repeatable.

As to measurement of the thrust angle and measurement of the alignment of the front and rear axles relative to one another, one popular method of alignment involves the use of lasers, which are attached to the trailer rear tires or wheel rims. The laser is directed to a crossbar typically temporarily mounted on the kingpin of the trailer. However, the laser system is not repeatable due to the fact that tire and rim surfaces vary enough to cause the alignment process to fall outside of the tolerances required to improve tire life.

Another alignment method commonly used has been to attach a simple tape measure to a conventional fish scale. The tape measure is extended between the kingpin and an outboardly extending reference structure threadably mounted on the threaded spindle end of the axle. Although the use of the fish scale is intended to regulate the tension in the tape measure to increase the accuracy of the process, too much tolerance occurs in this measuring method as well. This is because it is difficult to achieve the proper tension in the tape using the fish scale and at the same time read the measurement on the tape, thus adversely impacting the repeatability of the method. Moreover, the reference structures of the prior art fail to achieve repeatable proper positioning and alignment with the axle center line.

As a result, a longstanding need has existed in the art for an alignment measuring apparatus and method that overcomes the disadvantages of prior art apparatus and methods, and which is economical, easy to use, accurate and repeatable.

SUMMARY OF THE INVENTION

One objective of the present invention is to provide an apparatus and method that accurately measure the relative positions of selected vehicle components to allow the alignment of the vehicle to be determined.

Another objective of the present invention is to provide an apparatus and method to measure the relative positions of selected vehicle components in a dependably repeatable manner.

Yet another objective of the present invention is to provide an apparatus and method for measuring the relative positions of selected vehicle components that are easy to use and economical.

These objectives and advantages are obtained by the vehicle alignment measurement apparatus and method of the present invention. The vehicle includes a trailer having a pair of spaced-apart, parallel, longitudinally-extending frame rails connected to a bottom of the trailer, a kingpin for removably connecting the trailer to a tractor, and a plurality of wheels mounted on at least one axle suspended from the trailer. The vehicle alignment measurement apparatus includes a first reference member removably mountable on the kingpin of the trailer and a second reference member removably mountable on selected ones of the frame rails. The second reference member is disposed perpendicular to the selected rail. A third reference member is removably mountable on selected ones of the wheels and is alignable with a centerline of the axle on which the selected wheel is mounted. A distance between the first reference member and the second reference member is measurable to determine the alignment of the frame rail relative to the kingpin. A distance between the first reference member and the third reference member is measurable to determine the alignment of the axle relative to the kingpin. A method of measuring using the apparatus is also provided.

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
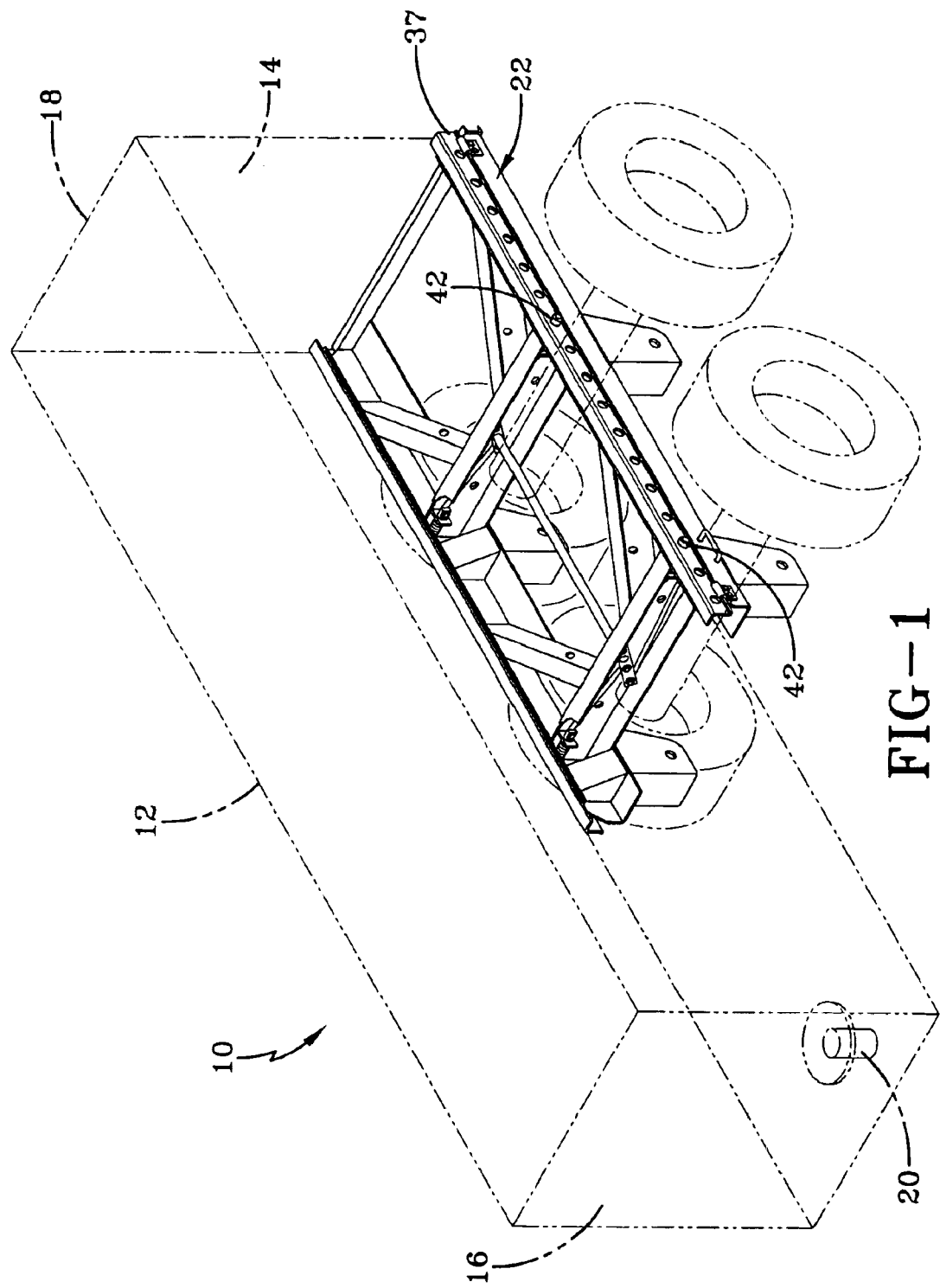
FIG. 1 is a perspective view of the trailer of a tractor-trailer, with the trailer slider, locking mechanism, trailer frame rails, and suspension assembly hangers shown in solid lines, and the remaining components of the trailer shown in broken lines.

Referring now to the drawings, where the showings are for purposes of illustrating preferred embodiments of the invention and not for purposes of limiting the same, FIG. 1 shows a typical trailer 10 of a tractor-trailer (tractor not shown) that is to have its alignment checked. Trailer 10 includes a curb side 12, an opposing driver's side 14, a front end 16, and a rear end 18. Mounted proximate front end 16 of trailer 10 and extending below the floor of the trailer is a kingpin 20. As is well-known in the semi-trailer art, kingpin 20 facilitates the pivot connection between trailer 10 and the tractor. A subframe or slider 22 is movably mounted on and beneath the primary frame (not shown) of trailer 10.

Figure 2A:
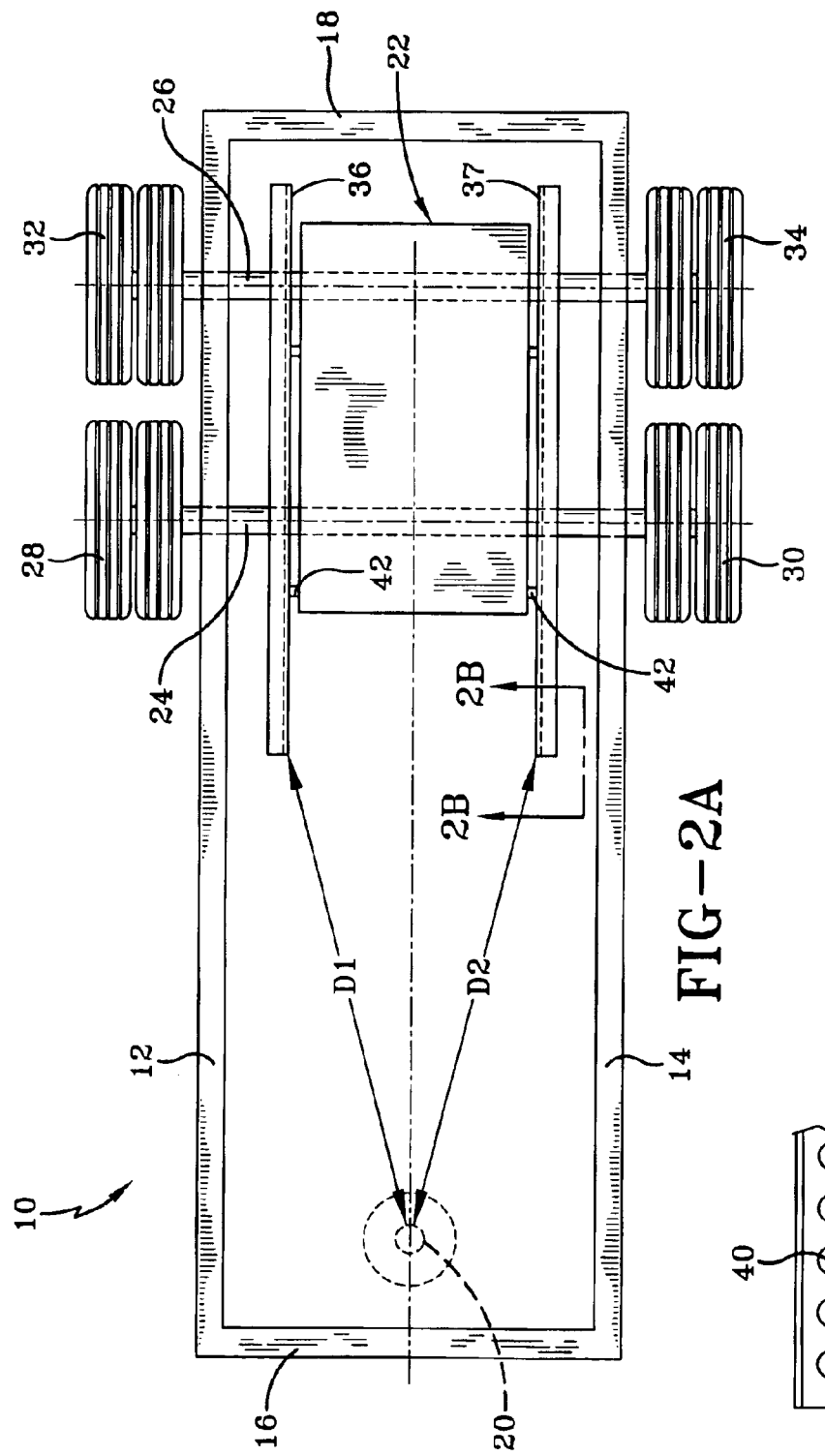
FIG. 2A is a schematic plan view of the trailer of FIG. 1, with hidden parts shown in broken lines, illustrating some of the steps of the alignment measurement method of the present invention.
Figure 2B:
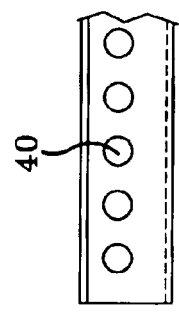
FIG. 2B is an enlarged view of a portion of one of the frame rails shown in FIG. 1.

Turning to FIGS. 2A and 2B, slider 22 allows repositioning of a front axle 24 and a rear axle 26 beneath trailer 10 for redistributing the load on the axles to ensure compliance with national, state and local road and bridge laws. Respective ends of front and rear axles 24, 26 are operatively connected to curb side front, driver's side front, curb side rear and driver's side rear wheels 28, 30, 32, and 34. Axles 24, 26 and wheels 28–34 are suspended from slider 22 by suspension assemblies (not shown), which are well-known in the art. Immovably mounted on the underside of the primary frame of trailer 10 and extending longitudinally in a spaced-apart, parallel manner are curb side and driver's side elongated frame rails 36 and 37, respectively. Each frame rail 36, 37 includes inboard and outboard facing surfaces. Slider 22 is slidably mounted on trailer frame rails 36, 37 and is positioned therealong in a usual manner by a plurality of locking pins 42 which engage selected ones of a plurality of orifices 40 formed in rails 36, 37 (FIG. 1).

Figure 3:
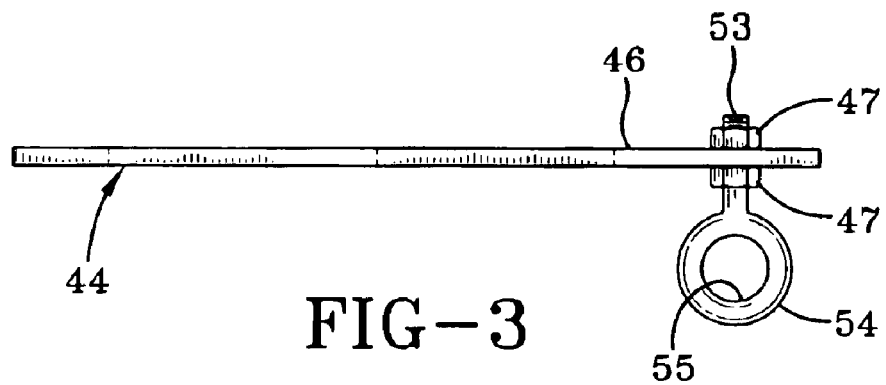
FIG. 3 is a side view of a kingpin adapter in accordance with the present invention.
Figure 4:
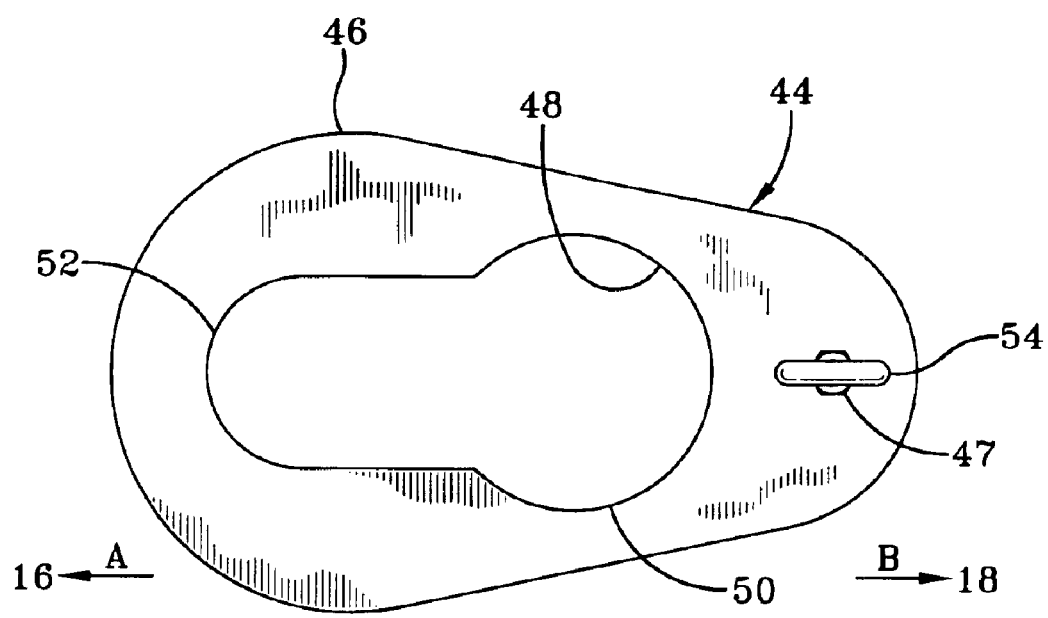
FIG. 4 is a bottom view of the kingpin adapter shown in FIG. 3.

In accordance with one of the important features of the present invention, when it is desired to measure the alignment of trailer frame rails 36, 37 relative to trailer kingpin 20 during manufacturing of trailer 10, a kingpin adapter 44 and a frame rail extender assembly 56 are employed. More specifically, kingpin adapter 44, shown in FIGS. 3 and 4, includes an adapter plate 46 formed with an orifice 48. A rounded portion 50 of orifice 48 allows adapter plate 46 to axially slide onto kingpin 20 (referring back to FIG. 1). Once kingpin 20 passes through rounded portion 50 of orifice 48, adapter plate 46 is moved in the direction of arrow B (toward rear end 18 of trailer 10) to cause a reduced-size slotted portion 52 of orifice 48 to frictionally engage kingpin 20. This allows adapter plate 46 to statically remain in position about kingpin 20. A threaded end 53 of a reference loop 54 passes through an opening formed in adapter plate 46 and is connected to the plate by fastening nuts 47. The looped portion 55 of reference loop 54 remains disposed below adapter plate 46 and toward rear end 18 of trailer 10 during the alignment measurement process, as will be described below.

When it is desired to disengage kingpin adapter 44 after alignment measurement is complete, the plate is moved in the direction of arrow A toward front end 16 of trailer 10. This movement eliminates the frictional engagement between slotted portion 52 of orifice 48 and kingpin 20, and causes rounded portion 50 of the orifice to surround the kingpin, thus enabling adapter 44 be slid off of the kingpin.

Figure 5:
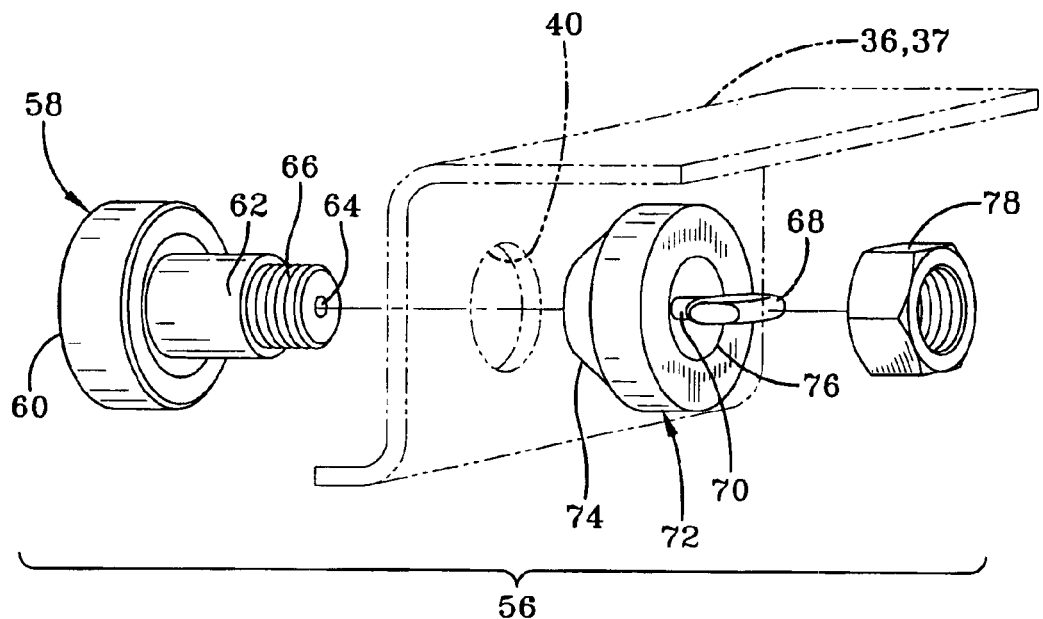
FIG. 5 is an exploded perspective view of a rail extender assembly in accordance with the present invention, with a portion of a trailer frame rail shown in broken lines.
Figure 6:
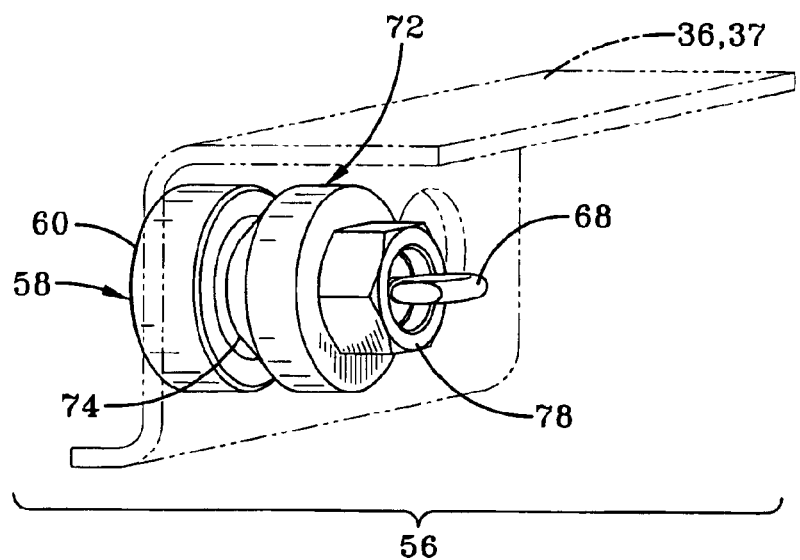
FIG. 6 is a view similar to FIG. 5, but showing the rail extender assembly in an assembled state on the rail.

FIGS. 5 and 6 show rail extender assembly 56, which is used in connection with kingpin adapter 44 to measure the alignment of trailer frame rails 36, 37 relative to trailer kingpin 20. Rail extender assembly 56 includes a reference member 58 having a base 60 with an outer diameter that is larger than the diameter of frame rail orifices 40. Extending axially from base 60 is a reduced-diameter shaft 62 having a threaded end 66 that defines a central bore 64 opposite base 60. A positioning member 72 includes a tapered end 74 and defines a central bore 76. A reference loop 68 includes a pin 70 designed to engage central bore 64 of reference member 58. A nut 78 is adapted to threadably engage reference member shaft end 66 to secure rail extender assembly 56 on frame rails 36, 37 during the alignment measurement steps set forth immediately below.

To begin the alignment measurement process, positioning member 72 is placed in a selected one of orifices 40 defined in curb side frame rail 36 from an inboard side of the rail. Positioning member tapered end 74 is dimensioned to partially pass through orifice 40 and seat positioning member 72 on the inboard surface of rail 36, since the positioning member has a maximum diameter that is greater than the diameter of the selected orifice. Shaft 62 of reference member 58 then is inserted from an outboard side of rail 36 into central bore 76 of positioning member 72. Nut 78 then is threadably engaged on reference member shaft threaded end 66 to secure the reference member to positioning member 72 about frame rail 36. Reference loop 68 thus is securely mounted perpendicular to and on the inboard side of frame rail 36, and is centered in selected orifice 40.

A corresponding transversely-aligned orifice 40 of driver's side frame rail 37 then is selected and the above process is repeated to affix a rail extender assembly 56 to the driver's side rail. Of course, rail extender assembly 56 may be affixed first to driver's side rail 37 and then to curb side rail 36 without affecting the concept of the invention.

In this manner, rail extender assembly 56 is attached to a selected orifice 40 in curb side rail 36 and to a corresponding orifice 40 in driver's side rail 37. A tape extensometer (not shown) is extended from reference loop 54 of kingpin adapter 44 (referring back to FIGS. 1, 3 and 4) to reference loop 68 of rail extender assembly 56 attached to curb side frame rail 36, to measure a distance D1, as illustrated in FIG. 2A. The tape extensometer is used to maintain tension and thus prevent sag in the indicator device, leading to greater accuracy of the distances that are measured. A preferred tape extensometer is available from Geokon, 48 Spencer St., Lebanon, N.H., 03766, and is sold under Model Numbers 1600 and 1610. The tape extensometer then is similarly extended from reference loop 54 removably connected to kingpin 20 to reference loop 68 removably connected to driver's side frame rail 37 to obtain measured distance D2.

Next, distance D1 is compared to distance D2. If the difference between D1 and D2, assuming one exists, is within accepted alignment tolerance levels, nothing needs to be done to align frame rails 36, 37 relative to kingpin 20. However, if the difference between D1 and D2 is outside of accepted alignment tolerance levels, rails 36, 37 are repositioned in a manner well-known in the art. It is to be noted that alignment tolerance levels are familiar to those having skill in the alignment art and depend on the specific vehicle and conditions involved.

It is understood that reference loop 68 of rail extender assembly 56 may be disposed on an outboard side of each frame rail 36, 37, if desired, when alignment measurements are taken. In such an instance, reference member 58 is positioned on the inboard side of respective rail 36, 37, while positioning member 72 and nut 78 are positioned on the outboard side of the respective rail.

It is to be noted that one or two rail extender assemblies 56 may be used. If one rail extender assembly 56 is used, the assembly is secured to curb side rail 36 and distance D1 is measured. The rail extender assembly 56 then is removed from curb side rail 36 and secured to driver's side rail 37, whereupon distance D2 is measured. Of course, distance D2 can be measured before distance D1. If two rail extender assemblies 56 are used, the assemblies are secured to curb side rail 36 and driver's side rail 37, respectively, whereupon distances D1 and D2 are measured.

Figure 7:
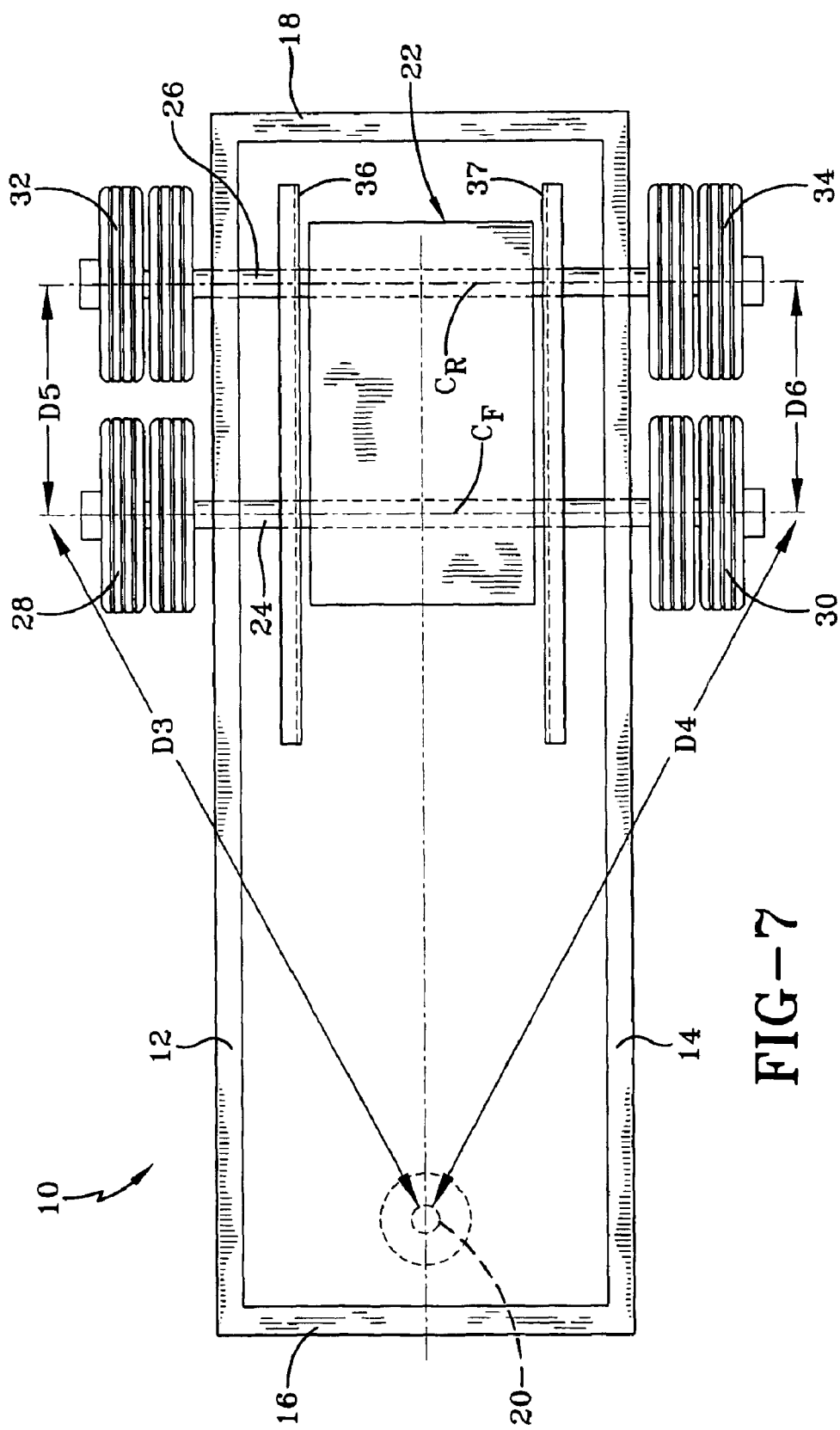
FIG. 7 is a view similar to FIG. 2A, illustrating other steps of the alignment measurement method of the present invention.
Figure 8:
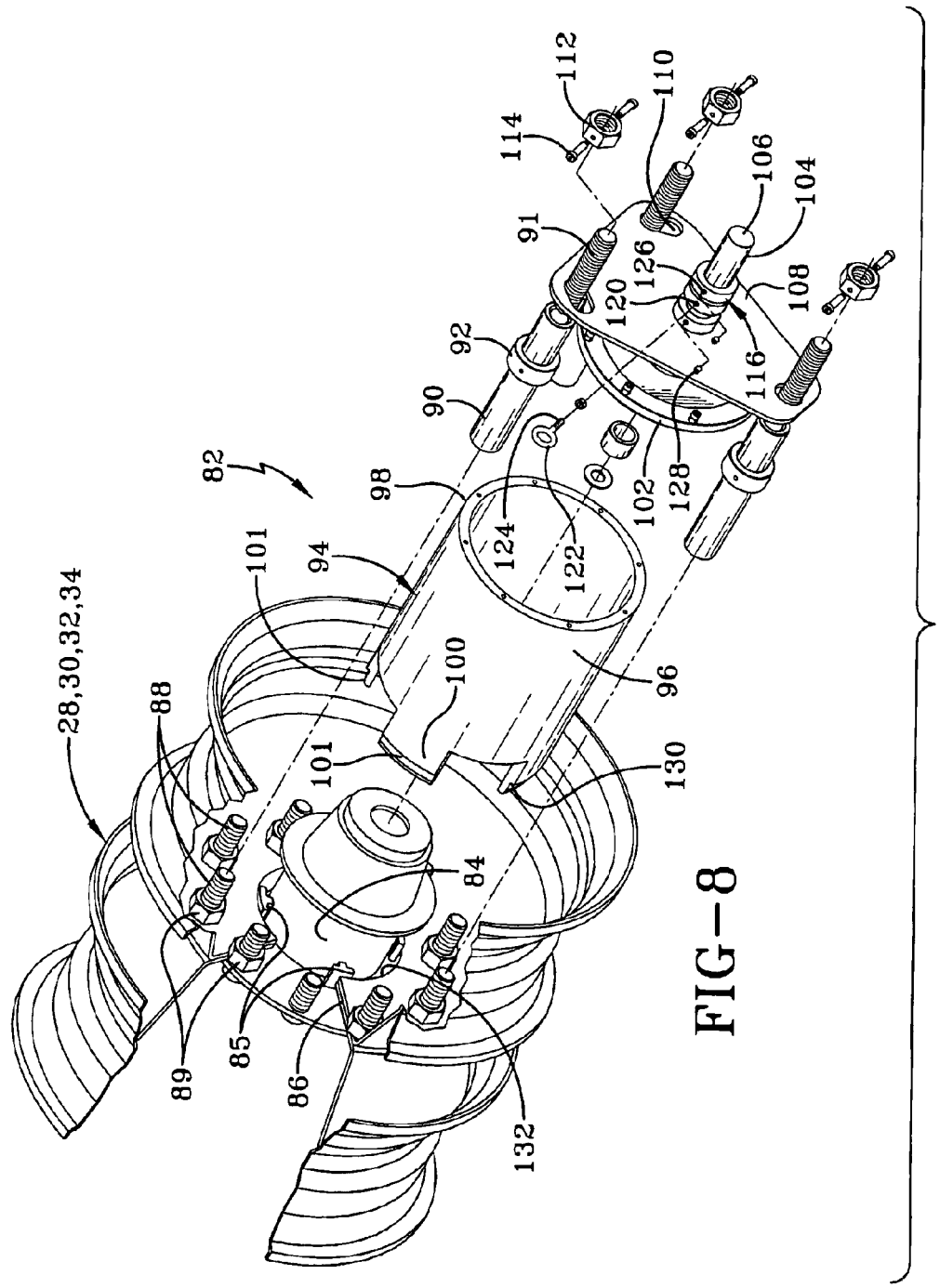
FIG. 8 is an exploded perspective view of a wheel extender assembly in accordance with the present invention, shown with a wheel that is illustrated in fragmentary form.
Figure 9:
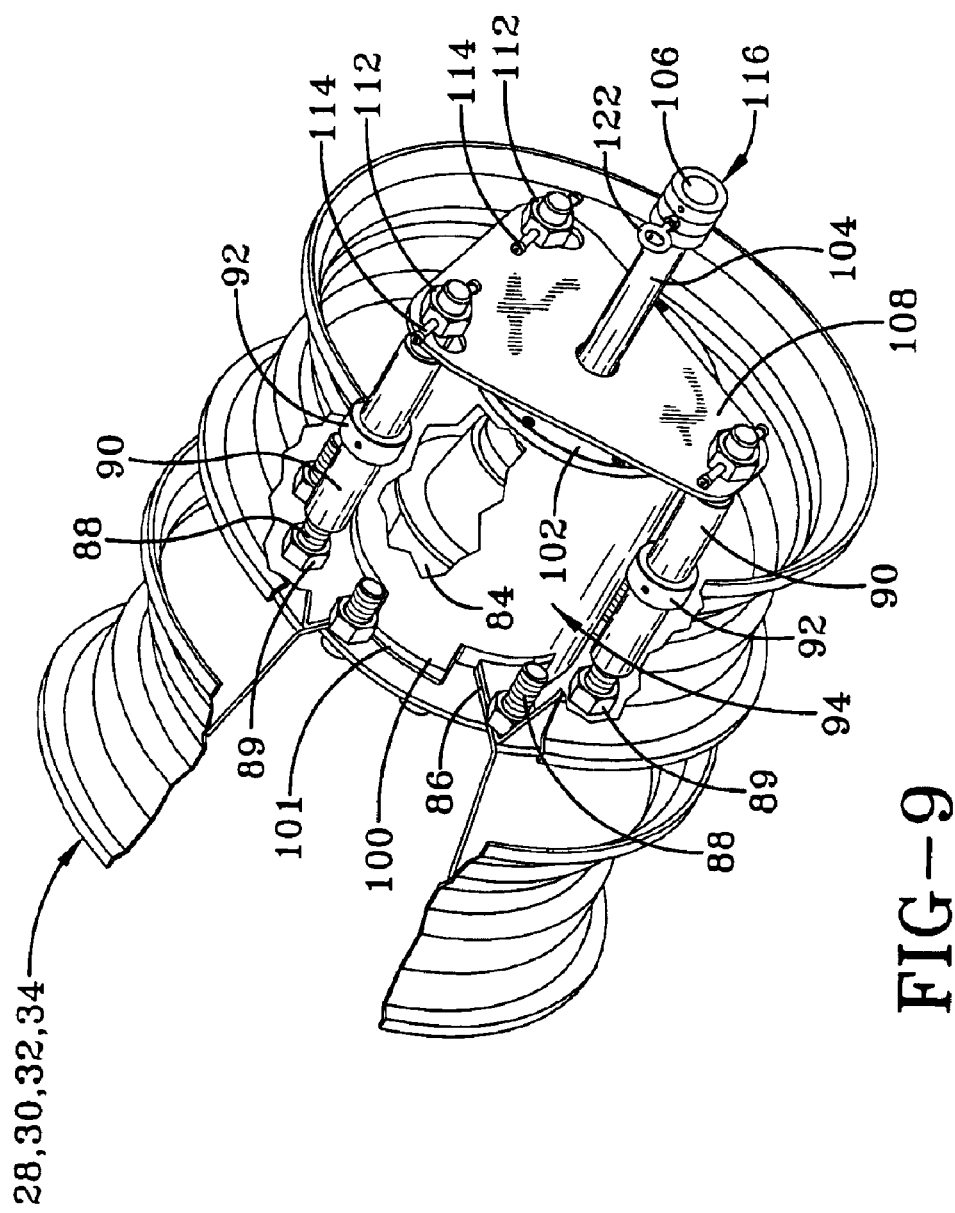
FIG. 9 is a view similar to FIG. 8, but showing the wheel extender assembly in an assembled state on the wheel.

To align front axle 24 relative to kingpin 20, and rear axle 26 relative to the front axle, either during manufacture of the trailer or in the field, as shown in FIG. 7, a wheel extender assembly 82 (FIGS. 8 and 9) is used. Wheels 28–34 each include a respective hub 84. It is well-known in the art that wheel bearings are mounted on the axle spindle (both not shown) via a tight slip fit, and those bearings are press-fit into hub 84. Each wheel 28–34, in turn, is mounted on its respective hub 84 on pilot surfaces 85 formed on the hub via a precision slip fit, and the wheel is tightened down on outboardly extending threaded studs 88 of the hub. More particularly, the precision fit of the wheel bearings on the axle spindle and in wheel hub 84 ensures that studs 88 are parallel and equally spaced from the axial center $C_F$ and $C_R$ of each respective axle 24, 26 (referring back to FIG. 7). Each wheel 28–34 includes a respective precision-formed vertically-oriented bolting flange plate 86 which abuts hub 84. Each wheel 28–34 is secured in place at flange plate 86 by nuts 89 that threadably engage studs 88.

In accordance with one of the key features of the present invention, a wheel extender assembly 82 mounts respectively on each wheel 28–34 in tight abutment with wheel flange plate 86 in the following manner. Wheel extender assembly 82 includes a plurality of alignment bars 90, and each alignment bar 90 is formed with inboard interior threads (not shown) to threadably engage selected ones of threaded studs 88. In the preferred embodiment of the invention, three (3) alignment bars 90 are used. Alignment bars 90 are uniformly spaced about the central axis $C_F$, $C_R$ of the respective wheel 28–34 when they engage selected studs 88. Alignment bars 90 also include outboardly extending threaded rods 91 to allow the mounting of a securing plate and fasteners, to be described below. Alignment rings 92 are disposed about alignment bars 90 to provide precision alignment of a cylindrical wheel extender 94 with the axial center of each respective wheel 28–34 about hub 84. Wheel extender 94 is adapted to slide inboardly between alignment bars 90 and into abutment with wheel flange plate 86.

More particularly, wheel extender 94 includes an inboard end 96 and an outboard end 98. Circumferentially-spaced legs 100 are formed on inboard end 96 to facilitate easy, yet repeatable placement of wheel extender 94 over hub 84 and in abutment with wheel flange plate 86. A step 101 is formed on each leg 100 to engage an inner diameter 132 of flange plate 86 in circumferential alignment with pilot surface 85 to align wheel extender 94 about each respective central axis $C_F$, $C_R$. Step 101 includes a shoulder surface 130 to ensure that wheel extender 94 abuts flange plate 86 in a flush manner. Shoulder surface 130 is parallel to flange plate 86 and seats firmly on the flange plate to keep wheel extender 94 perpendicular to the flange plate and thus aligned with each respective central axis $C_F$, $C_R$. In this manner, step 101 provides precise centering of wheel extender 94 about each respective central axis $C_F$, $C_R$, and flush contact with flange plate 86 for maintaining the extender perpendicular to the flange plate. This alignment is continued along the length of wheel extender 94 by alignment bars 90 and rings 92, as described above.

A guide ring 102 is attached to outboard end 98 of wheel extender 94, and includes an outboardly extending center bar 104. Guide ring 102 axially aligns center bar 104 along the longitudinal centerline of wheel extender 94 and thus the axis of the respective wheel 28–34 and centerline $C_F$, $C_R$ of the respective axle 24, 26. Center bar 104 therefore extends from outboard end 98 of wheel extender 94 and includes a distal end 106.

A generally triangular-shaped securing plate 108 is formed with a plurality of orifices 110 that allow securing plate 108 to slide over alignment bars 90 and center bar 104 to secure wheel extender 94 in contact with wheel flange plate 86, thus keeping distal end 106 of center bar 104 at a fixed distance from flange plate 86. Means to fasten securing plate 108 to guide ring 102, and hence, adjacent to outboard end 98 of wheel extender 94, are provided. The fastening means include nuts 112 that engage threaded rods 91 and set screws 114. Such fastening means could include other well-known fasteners, like cotter pins, locking pins, and similar devices. Disposed at distal end 106 of center bar 104 is a reference member 116. Reference member 116 is a cylindrical-shaped member formed with an opening 120. A reference loop 122 is connected to reference member 116 via a pin 124 that is integrally formed with the loop and that is received in an opening 120 formed in reference member 116 and fastened therein by any suitable means. To secure reference member 116 to center bar 104, other openings 126 are defined in the reference member which accept fasteners such as set screws 128. The arrangement of wheel extender 94 in firm, aligned contact with wheel flange plate 86 and the axially aligned connection of center bar 104, having reference loop 122 set at a fixed distance from flange plate 86, provides an accurate and repeatable axle alignment measurement position.

Referring back to FIG. 7, to measure the alignment of front axle 24 relative to kingpin 20, that is, the thrust angle, a wheel extender assembly 82 is mounted on curb side wheel 28. A separate wheel extender assembly 82 is mounted on driver's side wheel 30. Kingpin adapter 44, with reference loop 54 (referring back to FIG. 3), as described above, is removably mounted on kingpin 20. A tape extensometer, also as described above, is extended from reference loop 54 on kingpin 20 to reference loop 122 mounted on wheel extender assembly 82 on curb side wheel 28, allowing distance D3 to be measured. The tape extensometer then is extended from reference loop 54 attached to kingpin 20 to reference loop 122 mounted on wheel extender assembly 82 on driver's side wheel 30, allowing distance D4 to be measured.

The distances D3 and D4 then are compared to determine the difference, if any, between them. If the difference between distances D3 and D4 is within acceptable alignment tolerances, alignment is unnecessary. However, if the difference between D3 and D4 is outside of acceptable alignment tolerances, then alignment of the front axle 24 is performed as known in the art to alleviate any excessive thrust angle condition. Once front axle 24 is repositioned, its alignment again is checked until the alignment is within acceptable tolerance limits. Once the thrust angle is within acceptable tolerance limits, the alignment between front axle 24 and rear axle 26 is measured.

With continued reference to FIG. 7, the alignment between front axle 24 and rear axle 26 is performed as follows. A separate wheel extender assembly 82 is placed on outboard side of curb side front wheel 28, and on outboard side of curb side rear wheel 32. The distance between reference loop 122 mounted on wheel 28 and reference loop 122 mounted on wheel 32, that is, D5, is measured. Respective wheel extender assemblies 82 then are placed on front driver's side wheel 30 and on rear driver's side wheel 34. The distance between reference loop 122 mounted on wheel 30 and reference loop 122 mounted on wheel 34, that is, D6, is measured. Distance D5 is compared to distance D6 to determine if the difference, assuming one exists, between distances D5 and D6 is within acceptable alignment tolerances. If the difference between distances D5 and D6 is within acceptable alignment tolerances, then no alignment is necessary. However, if the difference between distances D5 and D6 is outside of acceptable alignment tolerances, then alignment of rear axle 26 relative to front axle 24 is necessary and is performed in a manner well-known to those skilled in the art.

It is to be noted that two or four wheel extender assemblies 82 can be employed according to the method of the present invention. If only two wheel extender assemblies 82 are to be employed, they are secured to curb side front wheel 28 and driver's side front wheel 30, respectively, to measure distances D3 and D4 (the thrust angle). Once alignment of the thrust angle is completed, the wheel extender assembly 82 on driver's side front wheel 30 is removed and placed on curb side rear wheel 32 to measure distance D5. Then the wheel extender assemblies 82 on curb side front and rear wheels 28, 32 are removed and secured to driver's side front and rear wheels 30, 34, so that distance D6 can be measured. Of course, D6 can be measured before D5, if desired. If four wheel extender assemblies 82 are employed, one is secured to each respective wheel 28–34 to obtain distances D3–D6.

Thus, it can be appreciated that the present invention provides an apparatus and method that measures, in a reliable, repeatable and economical manner, the alignment of trailer frame rails relative to the trailer kingpin, the alignment of the front slider axle relative to the kingpin, and the alignment of the slider axles relative to one another.

Thus, the present invention utilizes easy to operate, safe, simple, inexpensive and repeatable structures and methods to achieve quick and proper alignment of the trailer rails relative to the kingpin and of the axles relative to the kingpin and each other. It is understood that devices other than the extensometer could be utilized so long as it can be used to measure with proper tension, and structures other than assemblies 44, 56 and 82 also can be utilized on kingpin 20, frame rails 36, 37 and wheels 28–34, respectively, so long as they provide an accurate and repeatable reference point perpendicular to the rails and to the centerlines $C_F$, $C_R$ of axles 24, 26. It is further understood that the present invention can be used on wheels having varying numbers of studs 88.

As mentioned above, the measurement of the alignment of the frame rails relative to the kingpin occurs at the factory, before the frame rails are welded to the trailer. The measurement of the alignment of the front axle relative to the kingpin and the measurement of the alignment of the rear axle relative to the front axle are performed both in the factory and in the field. Irrespective of such practice, the invention can be used for all three of the aforementioned alignment measurements both in the factory and in the field.

In addition, while current practice in the art involves measurement of the alignment of the rear axle relative to the front axle, it is contemplated that developments in the art may provide a rear axle that is permanently fixed in a pre-aligned parallel position relative to the front axle. In such a case, measurement of the alignment of the rear axle relative to the front axle would not be necessary. However, the aspect of the invention relating to the alignment of the front axle relative to the kingpin would still be used to measure the alignment of the axles relative to the kingpin.

Accordingly, the vehicle alignment measurement apparatus and method is simplified, provides an effective, safe, inexpensive and efficient structure and method which achieves all the enumerated objectives, provides for eliminating difficulties encountered with prior alignment measurement apparatus and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Moreover, the description and illustration of the invention is by way of example, and the scope of the invention is not limited to the exact details shown or described.

Having now described the features, discoveries and principles of the invention, the manner in which the vehicle alignment measurement apparatus is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A vehicle alignment measurement apparatus, said vehicle including a trailer having a kingpin for removably connecting said trailer to a tractor and a plurality of wheels mounted on at least one axle suspended from said trailer, said vehicle alignment measurement apparatus comprising:

a first reference member removably mountable on said kingpin of said trailer; and a wheel extender assembly removably mountable on selected ones of said wheels, wherein said extender assembly includes:

a second reference member alignable with a centerline of said axle on which the selected wheel is mounted;

a plurality of alignment bars that are spaced about said centerline of said axle on which said selected wheel is mounted, and the bars extend parallel to said centerline, wherein each alignment bar engages a selected stud of said selected wheel;

a cylindrical wheel extender slidably disposed between the spaced alignment bars, including an inboard end and an outboard end, wherein the inboard end contacts a surface of said selected wheel;

a center bar operatively connected to and extending from the outboard end of the wheel extender approximately along said centerline, and including a distal end;

a securing plate defining orifices that receive the alignment bars and the center bar, allowing the plate to operatively contact the outboard end of the wheel extender; and means to secure the securing plate in operative contact with the outboard end of the wheel extender, wherein said second reference member is mounted on the distal end of the center bar, whereby a distance between said first reference member and said second reference member is measurable to determine the alignment of said axle relative to said kingpin.

2. The vehicle alignment measurement apparatus of claim 1, wherein at least one leg is formed on said wheel extender at said inboard end and said leg includes a step, whereby said step engages an inner diameter of said selected wheel.

3. The vehicle alignment measurement apparatus of claim 1, further comprising at least two of said wheel extender assemblies, wherein each of said wheel extender assemblies is removably mountable on a separate respective selected wheel of said vehicle.

4. The vehicle alignment measurement apparatus of claim 3, wherein said wheel extender assemblies are connected to separate respective wheels that are mounted on the same axle of the vehicle.

5. The vehicle alignment measurement apparatus of claim 3, wherein said wheel extender assemblies are connected to separate respective wheels that are mounted on different axles of the vehicle.

6. The vehicle alignment measurement apparatus of claim 1, wherein the first reference member includes an adapter plate.

7. The vehicle alignment measurement apparatus of claim 1, wherein said distance is measured with a tape extensometer.

8. A vehicle alignment measurement apparatus, said vehicle including a trailer having a pair of spaced-apart, parallel, longitudinally-extending frame rails connected to a bottom of said trailer, and further including a kingpin for removably connecting said trailer to a tractor, said vehicle alignment measurement apparatus comprising:

a first reference member removably mountable on said kingpin of said trailer; and a rail extender assembly removably mountable on selected ones of said frame rails, said extender assembly having a second reference member disposed perpendicular to said selected rail, whereby a distance between said first reference member and said second reference member is measurable to determine the alignment of said frame rail relative to said kingpin.

9. The vehicle alignment measurement apparatus of claim 8, wherein the rail extender assembly includes:

a base having a diameter which is larger than a diameter of selected ones of orifices formed in said frame rails;

a shaft extending axially from the base;

said second reference member disposed on an end of the shaft opposite the base; and a positioning member that includes a tapered outer surface which engages a selected one of said frame rail orifices, and defines a central bore that receives the shaft, whereby said second reference member is centered relative to the selected one of said frame rail orifices.

10. The vehicle alignment measurement apparatus of claim 9, wherein a first one of said selected frame rail orifices is formed in a curb side frame rail, and wherein a second one of said selected frame rail orifices is formed in a driver's side frame rail and is transversely aligned with the first one of said selected frame rail orifices.

11. The vehicle alignment measurement apparatus of claim 10, further comprising two of said rail extender assemblies, and wherein the first of two said rail extender assemblies is mountable in said first one of said selected frame rail orifices and the second of two said rail extender assemblies is mountable in said second one of said selected frame rail orifices.

12. The vehicle alignment measurement apparatus of claim 8, wherein the first reference member includes an adapter plate.

13. The vehicle alignment measurement apparatus of claim 8, wherein said distances are measured with a tape extensometer.

14. A vehicle alignment measurement apparatus, said vehicle including a trailer having a pair of spaced-apart, parallel, longitudinally-extending frame rails connected to a bottom of said trailer, a kingpin for removably connecting said trailer to a tractor, and a plurality of wheels mounted on at least one axle suspended from said trailer, said vehicle alignment measurement apparatus comprising:

a first reference member removably mountable on said kingpin of said trailer;

a second reference member removably mountable on selected ones of said frame rails, said second reference member being disposed perpendicular to said selected rail; and a third reference member removably mountable on selected ones of said wheels, said third reference member being alignable with a centerline of said axle on which the selected wheel is mounted, whereby a distance between said first reference member and said second reference member is measurable to determine the alignment of said frame rail relative to said kingpin, and a distance between said first reference member and said third reference member is measurable to determine the alignment of said axle relative to said kingpin.

15. A method for measuring the alignment of a vehicle, said vehicle including a trailer having a kingpin for removably connecting said trailer to a tractor and a plurality of wheels mounted on at least one axle suspended from said trailer, said method comprising the steps of:

removably mounting a first reference member on said kingpin of said trailer;

selecting a wheel;

removably mounting a wheel extender assembly on the selected wheel, wherein said extender assembly includes:

a second reference member alignable with a centerline of said axle on which the selected wheel is mounted;

a plurality of alignment bars that are spaced about said centerline of said axle on which said selected wheel is mounted, and the bars extend parallel to said centerline, wherein each alignment bar engages a selected stud of said selected wheel;

a cylindrical wheel extender slidably disposed between the spaced alignment bars, including an inboard end and an outboard end, wherein the inboard end contacts a surface of said selected wheel;

a center bar operatively connected to and extending from the outboard end of the wheel extender approximately along said centerline, and including a distal end;

a securing plate defining orifices that receive the alignment bars and the center bar, allowing the plate to operatively contact the outboard end of the wheel extender; and means to secure the securing plate in operative contact with the outboard end of the wheel extender, wherein said second reference member is mounted on the distal end of the center bar; and measuring a distance between said first reference member and said second reference member to determine the alignment of said axle relative to said kingpin.

16. The method of claim 15, wherein the step of measuring includes measuring said distance with a tape extensometer.

17. A method for measuring the alignment of a vehicle, said vehicle including a trailer having a pair of spaced-apart, parallel, longitudinally-extending frame rails connected to a bottom of said trailer, and further including a kingpin for removably connecting said trailer to a tractor, said method including the steps of:

removably mounting a first reference member on said kingpin of said trailer;

selecting a frame rail;

removably mounting a rail extender assembly on the selected rail, said extender assembly having a second reference member disposed perpendicular to said selected rail; and measuring a distance between said first reference member and said second reference member to determine the alignment of said frame rail relative to said kingpin.

18. The method of claim 17, wherein the step of measuring includes measuring said distance with a tape extensometer.

19. A method for measuring the alignment of a vehicle, said vehicle including a trailer having a plurality of wheels mounted on at least a pair of axles suspended from said trailer, said method comprising the steps of:

selecting a wheel mounted on a front axle of said vehicle;

removably mounting a first wheel extender assembly on the selected wheel mounted on the front axle of the vehicle, said first wheel extender assembly having a first reference member alignable with a centerline of said front axle;

selecting a wheel mounted on a rear axle of said vehicle;

removably mounting a second wheel extender assembly on the selected wheel mounted on the rear axle of the vehicle, said second wheel extender assembly including a second reference member alignable with a centerline of said rear axle, and wherein at least one of said first and said second wheel extender assemblies includes:

a plurality of alignment bars that are spaced about said centerline of said axle on which said selected wheel is mounted. and the bars extend parallel to said centerline, wherein each alignment bar engages a selected stud of said selected wheel;

a cylindrical wheel extender slidably disposed between the spaced alignment bars, including an inboard end and an outboard end, wherein the inboard end contacts a surface of said selected wheel;

a center bar operatively connected to and extending from the outboard end of the wheel extender approximately along said centerline, and including a distal end;

a securing plate defining orifices that receive the alignment bars and the center bar, allowing the plate to operatively contact the outboard end of the wheel extender; and means to secure the securing plate in operative contact with the outboard end of the wheel extender; and measuring a distance between said first reference member and said second reference member to determine the alignment of one of said front and rear axles relative to the other of said front and rear axles.

20. A method of measuring the alignment of a vehicle, said vehicle including a trailer having a pair of spaced-apart, parallel, longitudinally-extending same rails connected to a bottom of said trailer, a kingpin for removably connecting said trailer to a tractor and a plurality of wheels mounted on at least one axle suspended from said trailer, said method comprising the steps of:

removably mounting a first reference member on said kingpin of said trailer;

selecting a frame rail;

removably mounting a second reference member on said selected framed rail perpendicular to said selected rail;

selecting a wheel;

removably mounting a third reference member on said selected wheel alignable with a centerline of said axle on which the selected wheel is mounted;

measuring a distance between said first reference member and said second reference member to determine the alignment of said frame rail relative to said kingpin; and measuring a distance between said first reference member and said third reference member to determine the alignment of said axle relative to said kingpin.

21. The method of claim 20, wherein the step of removably mounting said second reference member includes providing a rail extender assembly.

22. The method of claim 20, wherein the step of removably mounting said third reference member includes providing a wheel extender assembly.

* * * * *